United States Patent [19]

Tatematsu et al.

[11] 4,353,095

[45] Oct. 5, 1982

[54] FACSIMILE BANDWIDTH COMPRESSION METHOD SYSTEM AND APPARATUS

[75] Inventors: Kenzou Tatematsu, Amagasaki; Yasuhiro Sugihara, Katano; Hiroyuki Andou, Hirakata; Tatsuo Seki, Osaka; Yoshito Dezaki, Osaka; Yasukazu Nishino, Osaka, all of Japan

[73] Assignee: Matsushita Electric Industrial Co., Ltd., Kadoma, Japan

[21] Appl. No.: 6,245

[22] Filed: Jan. 24, 1979

[30] Foreign Application Priority Data

Jan. 31, 1978 [JP] Japan .................... 53-10104
Jun. 22, 1978 [JP] Japan .................... 53-76054
Jun. 22, 1978 [JP] Japan .................... 53-76055

[51] Int. Cl.³ ............................................ H04N 7/12
[52] U.S. Cl. .................................. 358/260; 358/288
[58] Field of Search .............. 358/260, 263, 288; 179/15 BS

[56] References Cited

U.S. PATENT DOCUMENTS 3,588,329 6/1971 Monk ................... 358/260
3,879,580 4/1975 Schlosser et al. ...... 779/15 BS
4,044,382 8/1977 Yagishita ............... 358/260
4,058,674 11/1977 Komura ................. 358/260
4,186,415 1/1980 Takayama .............. 358/261

FOREIGN PATENT DOCUMENTS 2747020 5/1978 Fed. Rep. of Germany ...... 358/260

Primary Examiner—Joseph A. Orsino, Jr.
Attorney, Agent, or Firm—Cushman, Darby & Cushman

[57] ABSTRACT

A facsimile bandwidth compression method using a facsimile signal comprising a synchronizing signal part, a control signal part having digital signals made by coding signals of existence or non-existence of substantial picture information in blocks which are made by dividing the picture information signal into a specified uniform length segment, and a picture information part consisting of picture information signal of the blocks containing at least one black picture element. A reference signal having an inverted carrier phase from that of the synchronizing signal part is inserted between the synchronizing signal part and the control part. The coding of the digital signal is made by inverting the carrier phase. Guard bands having specified levels are inserted between the blocks, thereby assuring more accurate and fine synchronization than the known WBS (white block skipping) art, and hence, a very clear reproduced picture.

41 Claims, 35 Drawing Figures

FIG. 21
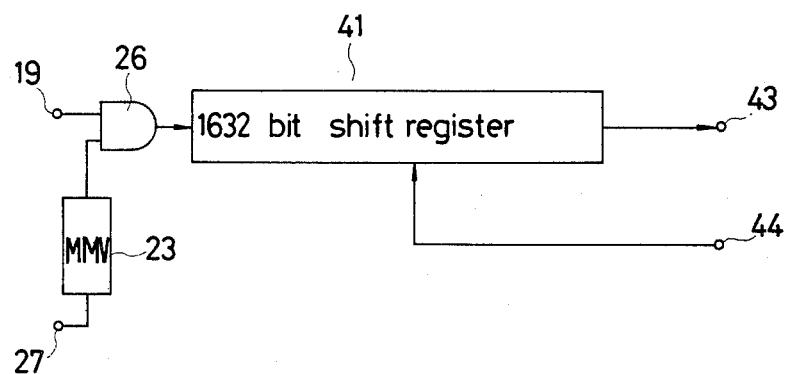
FIG. 22
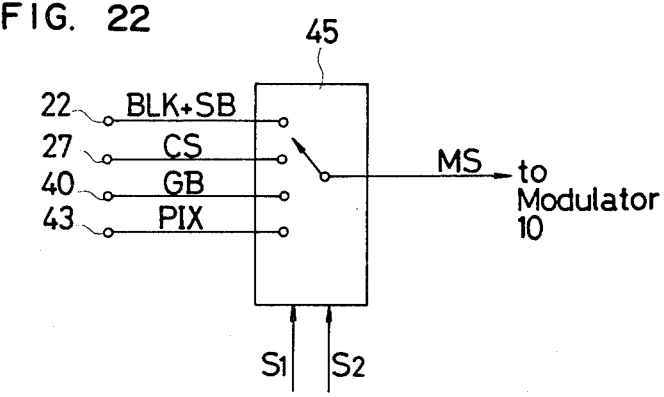
FIG. 23
| GBf | GBs | GBc |
|-----|-----|-----|
| 0 | 0 | 1 |
| 0 | 1 | 0 |
| 1 | 0 | 1 |
| 1 | 1 | 1 |

FACSIMILE BANDWIDTH COMPRESSION METHOD SYSTEM AND APPARATUS

BACKGROUND OF THE INVENTION

1. Field of the technology

The present invention relates to an improvement of a WBS (the white block skipping) method of bandwidth compression of transmitting facsimile signal, wherein picture signal is divided into a specified number of blocks and information to indicate existence of at least a black (or white) picture element therein and information to indicate the black (or white) picture elements.

2. Prior Art

In the conventional facsimile system, when black patterns are printed on a white paper, so called white block skipping method has been used. The white block skipping method is that picture information of one horizontal scanning line is divided into N blocks each including specified number of picture elements, and existence of black pattern in respective blocks are detected, and encoding and transmission are made with respect to the detected signal, and information only of blocks having at least one black pel (picture element) is sequentially transmitted as the picture information.

Such conventional method is elucidated referring to FIG. 1. First, synchronizing signal "a" is issued for a time length of $l_1$, subsequently a control signal "b" for indicating existence or non-existence of picture information for the block is issued for a time length $l_2$, and subsequently an information signal "c" only for the block containing picture information, i.e., at least a black picture element is issued. For example, provided that a picture signal in one horizontal scanning line is divided into N blocks wherein N=10, and that only 3rd and 7th blocks contain black picture elements, the control signal "b" has the information that blocks of No. 1, 2, 4, 5, 6, 8, 9 and 10 contain white picture elements only and that blocks of No. 3 and 7 contain black picture elements. The picture information part "c" includes a picture signal for block No. 3 and subsequently that for block No. 7. When signal of a horizontal scanning line consists of white picture element only, then the picture information "c" is not issued at all. By adopting the abovementioned white block skipping method, transmission time length of the facsimile is considerably compressed.

However, the abovementioned white skipping method has a drawback that a time length $l_3$ of the picture information part "c" varies depending on number of blocks containing black picture elments, while synchronizing signal "a" and control signal "b" have constant time length. In the above-mentioned signal bandwidth compression system, if an error of decoding of the control signal happens, then the time position and number of black picture element in reproduced picture signal part is liable to differ from the contents of the information in the transmitted picture signal. Accordingly, the picture information is liable to be allotted in wrong block or number of blocks of the picture signal becomes excess or deficient resulting in failure of right picture reproduction.

SUMMARY OF THE INVENTION

The present invention provides a novel system and method of facsimile bandwidth compression for overcoming the abovementioned problem of the conventional bandwidth compression method.

More particularly, the present invention provides a facsimile bandwidth compression system and method wherein the facsimile signal has a synchronizing signal, followed by a control signal to indicate existence of picture signal in blocks formed by dividing the picture signal into a specified number N, and by a picture signal part to indicate picture information of the blocks containing the picture signal, characterized in that means are provided for easy restoration of synchronization, thereby preventing decrease of picture quality due to jittering on the line or the like.

BRIEF EXPLANATION OF THE DRAWING

FIG. 17 to FIG. 21 are circuit diagrams of various parts of the apparatus of FIG. 16, wherein:

FIG. 17 is the circuit diagram of a line memory 2.

FIG. 18 is the circuit diagram of a synchronizing signal generator 3.

FIG. 19 is the circuit diagram of a block signal generator 4.

FIG. 20 is the circuit diagram of a guard band generator 13.

FIG. 21 is the circuit diagram of the picture information memory 12.

FIG. 22 is the circuit diagram of a signal order control circuit 9.

FIG. 23 is the diagram showing truth table for determining central bit of the guard band.

DETAILED DESCRIPTION OF PREFERRED EMBODIMENTS

The feature of the constitution of the present invention is as follows:

A reference signal is inserted between a synchronizing signal and a subsequent control signal which is made by encoding a detection signal of existence of black or white picture element in a block made by dividing picture signal into specified number, phase of carrier in the part of said reference signal is selected to be opposite to that of the control signal, and guard band signals are inserted betweeen respective blocks of picture signals.

By means of the abovementioned facsimile signal, a high quality and high speed facsimile transmission can be made.

Since the system and method of the present invention is based on and utilizing the conventional art of bandwidth compression, the detailed description on the present invention is made with reference to the constitution, operation and problem of the conventional system and to the problem to be solved.

Figure 1:
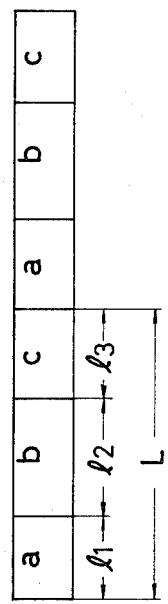
FIG. 1 is a diagram showing conventional facsimile transmission signal.
Figure 2:
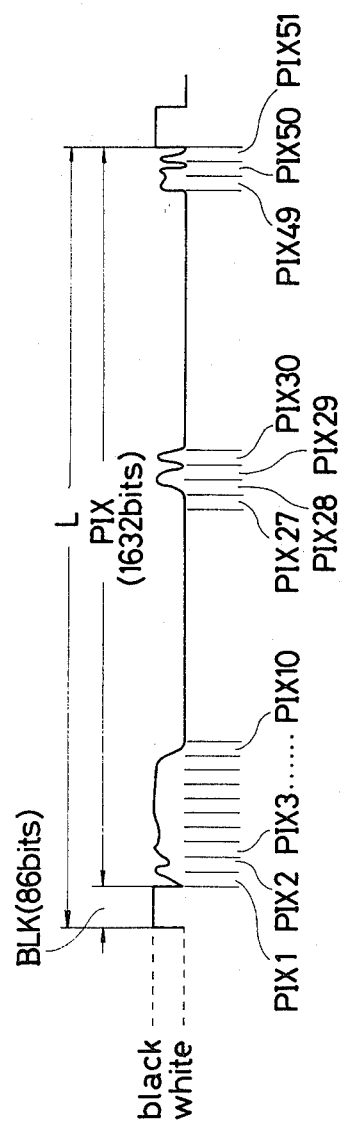
FIG. 2, FIG. 3(a) and FIG. 3(b) are diagrams showing signals of conventional facsimile transmission from which the art of the present invention started.
Figure 3:
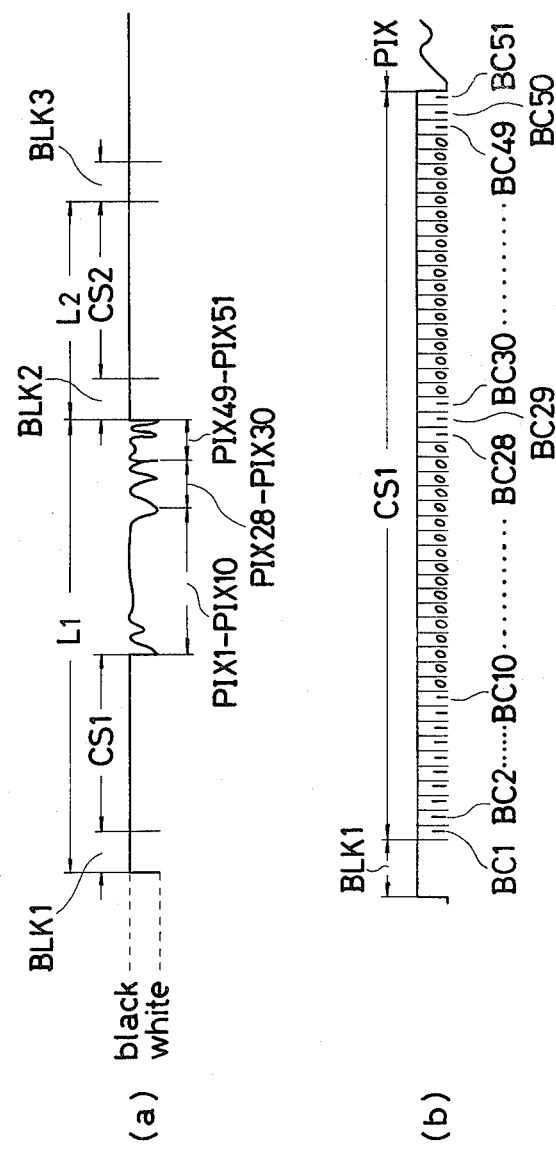

In FIG. 2, which shows signals of conventional facsimile transmission from which the art of the present invention started, the time length of picture information period PIX is determined so as to have 1632 bits and that of synchronizing signal BLK to have 86 bits (i.e., 5% of PIX), by considering width of the original document and required resolution of the reproduced document. The picture information period PIX is divided into 51 blocks of PIX1 to PIX51, and each block has 32 bits. In the example of FIG. 2, the picture information exists only in the blocks PIX1-PIX10, PIX28-PIX30 and PIX49-PIX50. The existences and non-existences of the picture information in the divided blocks are encoded to form the control signal part CS1, and the control signal part CS1 is transmitted by inserting immediately after the synchronizing signal BLK1 as shown in FIG. 3(a). And after the control signal part CS1 are arranged picture information signals of the blocks PIX1-PIX10, PIX28-PIX30 and PIX49-PIX50 as they are. By such insertion of the control signal part CS1, the transmission time becomes longer by the time length of the control signal part, but the overall transmission time can be shortened by omission of transmission of the white blocks PIX11-PIX27 and PIX31-PIX48. In FIG. 3(a), the time length L1 shows the time length for the abovementioned blocks containing picture information. The subsequent time length L2 shows the time length for the blocks which have no picture information. In the blocks of the time length of L2 the signals of the picture information are all white, and accordingly, there is no need of transmitting the picture information, and therefore, the signal in the time length L2 consists only with synchronizing signal BLK2 and subsequent control signal CS2.

Next is explained referring to FIG. 3(b) the control signal part CS, for example CS1 or CS2, which is formed by encoding the signal of existence or non-existence of picture information in the blocks in question.

Each of the control signal parts CS1 or CS2, . . . are divided into N blocks (namely from 1st block to Nth block). When a block includes at least one picture information, then a digital signal "1" is allotted for the existance of the picture information in the block. On the contrary, when a block does not include picture information at all, then a digital signal "0" is allotted for the non existence of the picture information in the block. The designation of the signal "1" and "0" can be contrary to each other. In an ordinary facsimile apparatus where the picture information is transmitted as black signal, then "1" is for black and "0" is for white. The polarity of the transmitted signal can be selected in either one. For the picture information as shown in FIG. 2, the blocks PIX1-PIX10, PIX27-PIX30, and PIX49-PIX50 have the picture information.

Accordingly, the control signal CS1 consists of 17 block codes BC1-BC10, BC27-BC30 and BC49-BC51. If these BC signals are selected "1", then other parts are "0" as shown in FIG. 3(b).

In the abovementioned conventional system, in accordance with change of number of blocks containing the image information, the overall time length L1 changes. Therefore, on the side of the receiver set, when the synchronizing signal is received it is not necessarily clear to find the point from which the control signal begins. For example, in a case shown by FIG. 4(a) wherein the synchronizing signal BLK is of black level and the beginning block BC1 of the control signal CS is also of black level, then it will be difficult to precisely find the end position of the synchronizing signal.

Figure 4:
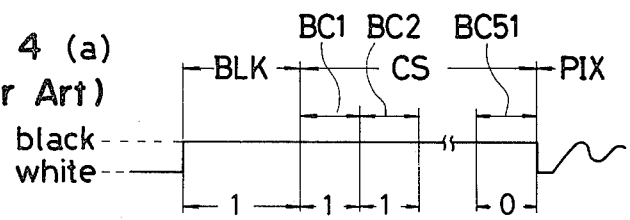
FIG. 4(a) and FIG. 4(b) are enlarged diagrams showing relations between synchronizing signal, reference signal and control signal of the prior art and the present invention, respectively.
Figure 4:
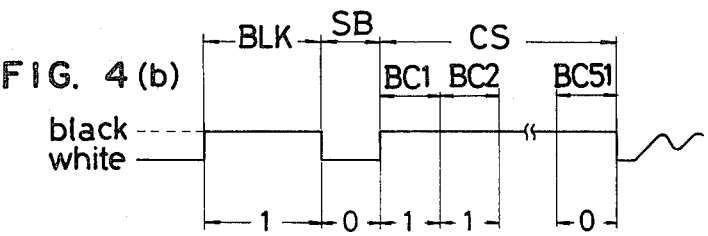

In order to solve the abovementioned problem, the present invention provides a reference signal SB between the synchronizing signal BLK and the beginning part BC1 of the control signal as shown in FIG. 4(b). By such insertion of the reference signal SB, the ending time of the synchronizing signal BLK can be clearly detected, and the starting of the control signal CS can be detected with certainty, thereby assuring certain reproduction of the transmitted signal.

In order to detect the control signal with certainty, the maximum frequency of the control signal should be included within the bandwidth of telephone signal transmission system. Furthermore, in order not to make erroneous detections due to jittering in the telephone line, the control signal should have a sufficient length in comparison with the picture information signal part. For example, when a principal scanning speed (the scanning line frequency) is 6 Hz, the maximum picture signal frequency is given by:

1718 bits $\times$ 6 Hz $\div$ 2 = 5154 Hz.

The number of bits, 1718, is derived as follows.

Total scanning line length is 204 mm and resolution is 8 picture elements/mm, and therefore the picture information of one scanning line has, for maximum number of bit, 204$\times$8=1632 bits. Then, by providing the picture signal with 5% blanking period, the maximum picture signal is given by 1632 bits $\times$100/100−5=1718 bits.

The abovementioned maximum frequency 5154 Hz greatly exceeds the upper limit frequency 3.1 KHz of telephone transmission system. Though the adverse effect of exceeding the limit frequency with the respect to the picture signal is only loss of quality of the picture, it fatally affects the control signal by causing the complete loss of synchronization with respect to control signal at the side of receiver.

Accordingly in the present invention, in order to assure reliable receiving of the control signal, the time length of one block of the control signal part is at least twice, for example 4-times or 8-times, the time length of a bit of the picture information signal part. Then, the maximum frequency of the control signal can be lowered to 5154 Hz ÷ 4 = 1288.5 Hz or
5154 Hz ÷ 8 = 644.25 Hz.

In the belowmentioned examples, the unit length of one block of the control signal is made 4-times the time length of a bit of the picture information signal.

Next, it is necessary to provide the system with an ability of self-restoring of synchronization when an error of synchronization accidentially arises at the receiving side. Such restoring function is described below.

Figure 5:
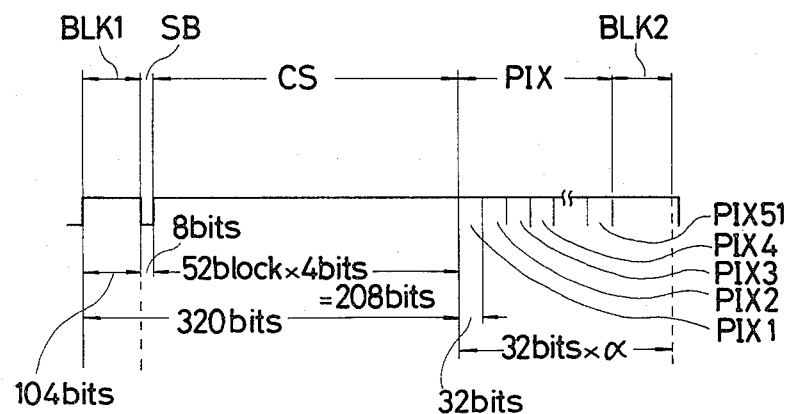
FIG. 5 is an enlarged diagram showing relations between synchronizing signal, reference signal, control signal and picture information signal of the present invention.

In the present invention, the time length L for a scanning line is variable depending on the contents of the picture information. The time length L varies, by taking the time length "m" of one block of the picture information as the minimum unit of the time length. Therefore, by making a total of time length of the part of signal for the time length of one scanning line to be an integral multiple of the time length of "m" bits of one block, it is possible to make the time length of the scanning line to be an integral multiple of the time length "m" of the block length. Then, whenever by any accident an error takes place to cause a loss of synchronization, restoration of the synchronization can be easily made, by seeking the synchronizing signal utilizing the time length "m" of one block as a substitute period of the synchronizing signal. The abovementioned is elucidated with reference to FIG. 5 showing an example of an actual number, wherein, provided that each one block consists of m = 32 bits, the synchronizing signal BLK consists of 104 bits, reference signal consists of 8 bits, and each code of the control signal CS consists of 4 bits, (namely, the control signal consists of 51 blocks having 51 blocks × 4 bits = 204 bits), then further adding a dummy code block consisting of 4 bits, then the total of the synchronizing signal BLK (for example BLK1 of 104 bits), the reference signal SB (of 8 bits) and the control signal (of 204 bits) with the dummy code block (of 4 bits) is given by 104 + 8 + (51 × 4 + 4) = 104 + 8 + 208 = 320 bits. The 320 bits equals 10 times of bit number of one block. Namely, the total bits number of one scanning line becomes an integral multiple of the bit number of the unit bit "m" (= 32) of each block of the picture information part.

Figure 6:
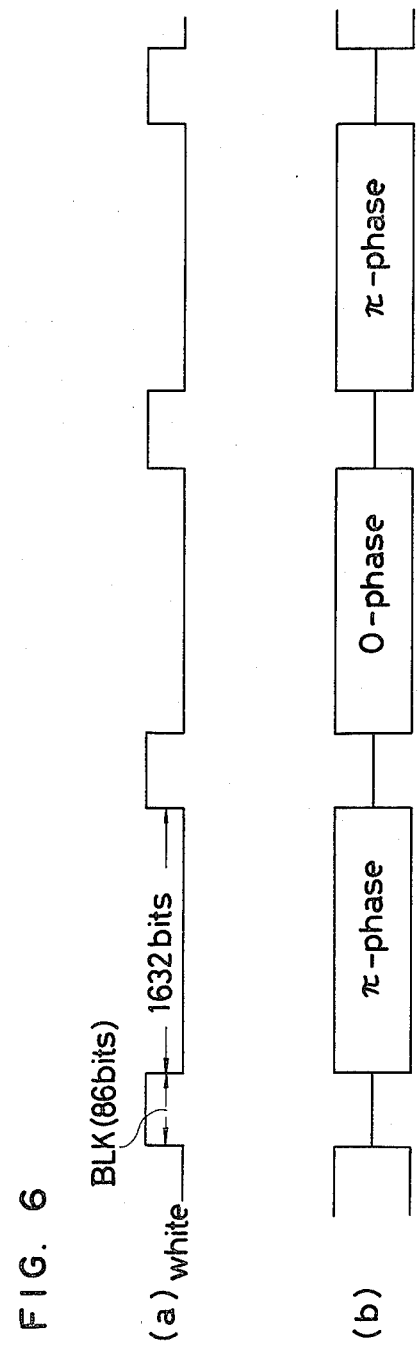
FIG. 6 is a waveform diagram of phase signal for synchronization.

Next, an elucidation is made on a measure for restoring synchronization erroneously lost on the receiver's side. At first, synchronization or phase-matching is made between a transmitter and a receiver prior to a transmission of the picture information signal. This is made by transmitting a phase signal shown by FIG. 6(a) for 6 seconds. The phase signal comprises alternations of 86 bits length synchronizing signal parts BLK and 1632 bits length white level picture signal parts. The actual way of transmission of the phase signal is that the synchronizing signal parts BLK are made blank (no carrier is transmitted for the periods of BLKs) and the white level picture information parts are transmitted with their phases O and π alternatingly, as shown in FIG. 6(b). After transmitting the phase signal for 6 seconds, and when a synchronization is made on the receiver side, the receiver sends a synchronize confirmation signal CFR back to the transmitter. The transmitter, after confirming the synchronize confirmation signal, sends out actual picture information signals.

Figure 7A:
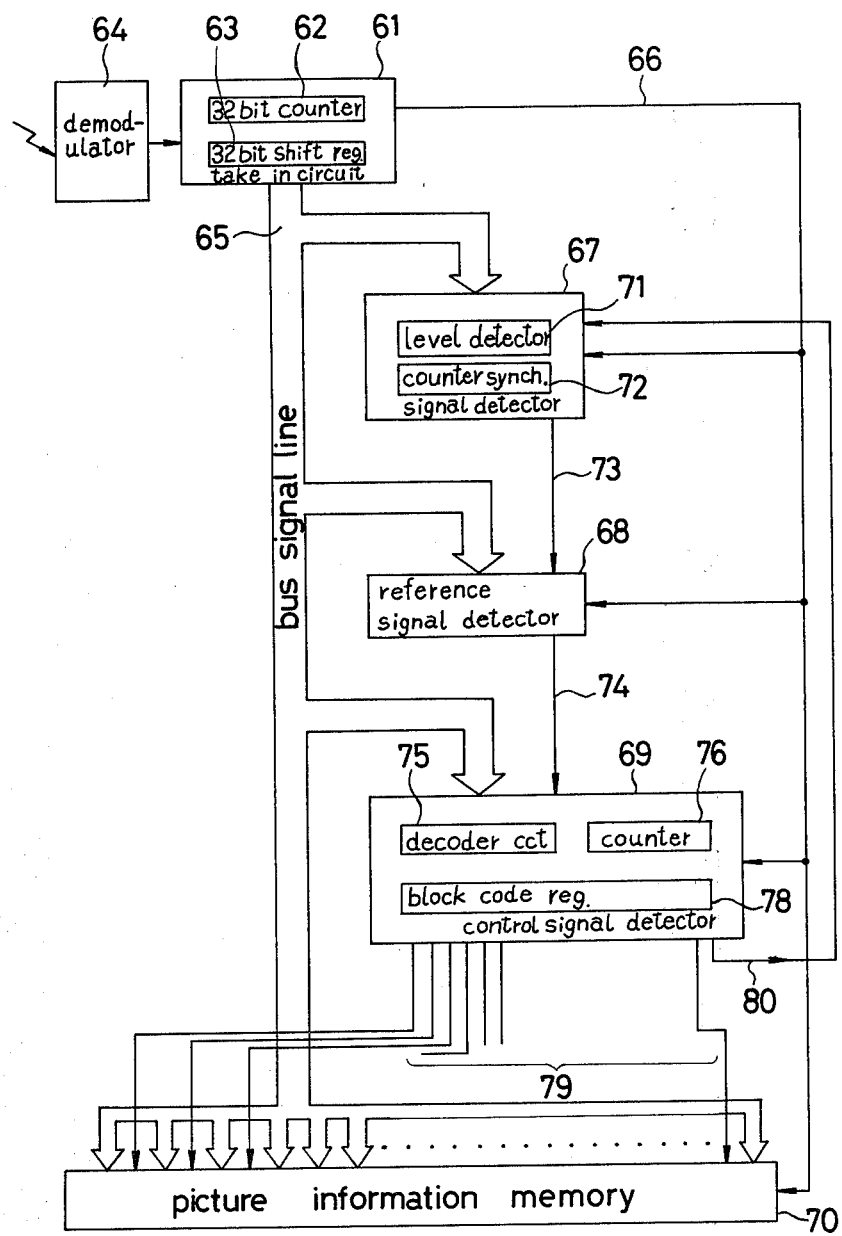
FIG. 7(a) is a block diagram showing an apparatus for reproducing the picture signal by detecting the synchronizing signal and the reference signal and decoding the control signal.

FIG. 7(a) shows an example of a receiver which reproduces the abovementioned picture information by detecting the synchronizing signal and reference signal and decoding the control signal. In the apparatus of FIG. 7(a), a 32-bit take-in circuit 61 includes a 32-bit counter 62 and 32 bit shift register 63, and takes a signal received and decoded by a demodulator 64 in the shift register 63. The shift register 63 sends out 32 bit parallel outputs to its bus signal lines 65, and the 32-bit counter 62 sends out clock pulse signal to the output line 66 after every 32 bit count. Corresponding signal of the parallel outputs of the take-in circuit 61 through the bus signal line 65 and the clock pulse signal through the line 66 are fed to a synchronizing signal detector 67, a reference signal detector 68, a control signal decoder 69 and a reproduced picture information memory 70. The synchronizing signal detector 67 comprises a level detector 71 which detects levels of respective 32 bit signals and a counter 72 which counts three clock pulse signals to issue one output signal from its output line 73, and detects the synchronizing signal BLK having the same level of 96 bits (= 32 × 3 bits) length and gives synchronization completion signal through an output line 73 to the reference signal detector 68. The reference signal detector 68 detects the reference signal SB of 8 bits within subsequent 32 bits time by using the clock pulse signal from the line 66 and the synchronization completion signal from the line 73, and gives a decode starting signal through the line 74 to the control signal decoder 69. The control signal decoder 69 comprises a decoder circuit 75, a counter 76 which counts 6 input pulses of the clock pulse signal on the line 66 and a 51-bit clock code register 78. The control signal decoder 69 takes a beginning part (16-bits) of the control signal CS which is subsequent to the reference signal SB of 8 bits therein, and also takes the remaining part (having the length of 32 bits × 6 = 192 bits) of the control signal therein, and puts them in the block code register 78. Then, from respective bits of the block code register 78 to the corresponding blocks of the picture information memory 70 through lines 79, a picture information take-in signal is sent and stored in the memory 70. Also the control signal decoder 69 gives a line-end signal through a line 80 to the synchronizing signal detector 67 when the taking-in of the picture information for one line is completed or when there is no picture information PIX at the time of completion of taking-in of the control signal CS for one line, and then, a taking-in of signal for one line is over.

The reproduced picture information memory 70 comprises an 1,632 bit register, which is divided into 51 blocks respectively including 32 bits and to which corresponding line of the bus signal line 65 is connected. By printing out the contents of the reproduced picture information memory 70, a transmitted picture or document is reproduced.

Figure 7B:
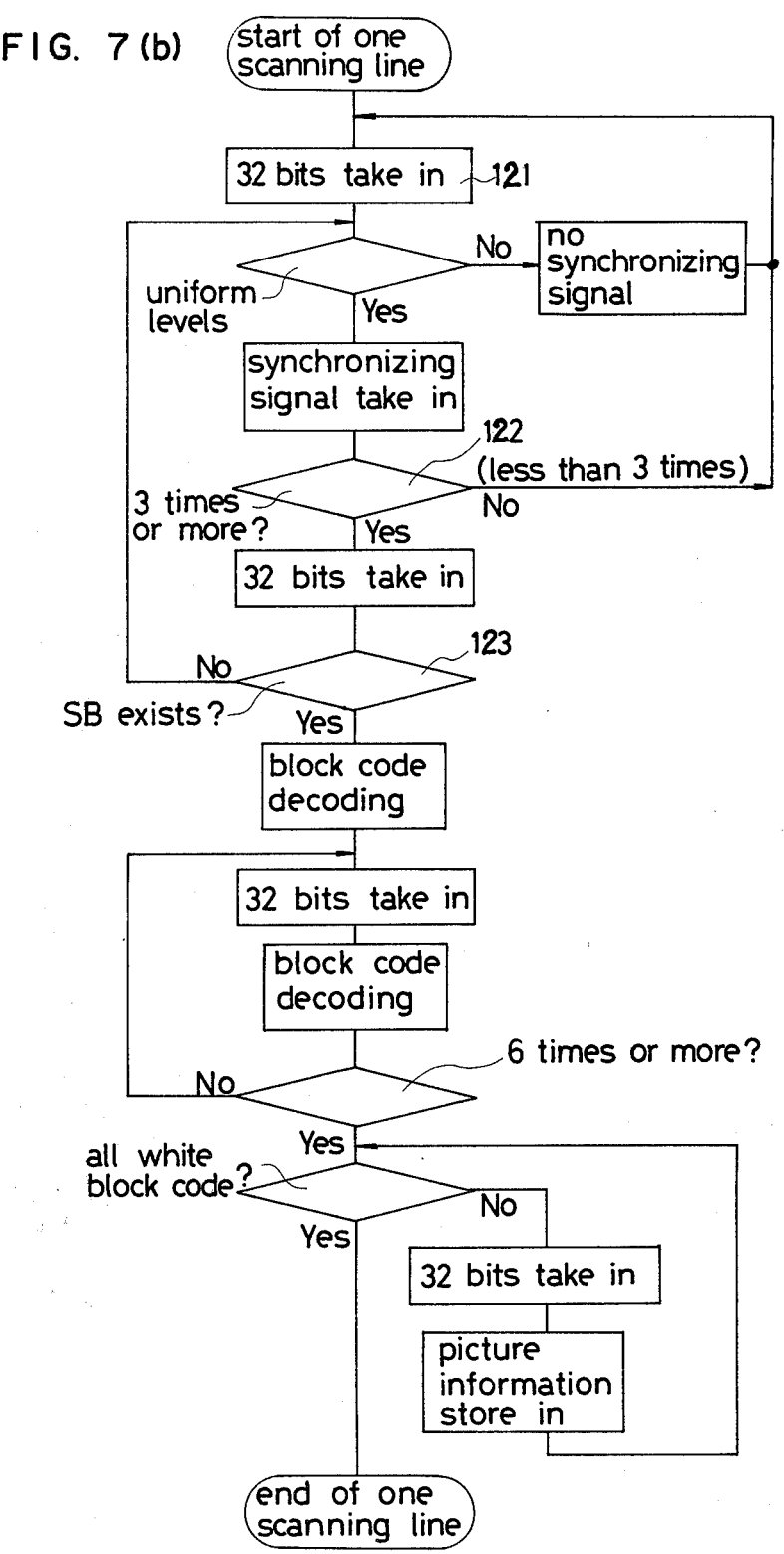
FIG. 7(b) is a flow chart illustrating the operation of the apparatus of FIG. 7(a).

FIG. 7(b), is a flow chart showing a process, after completion of a synchronization by known art, of steps from the decoding of the controlling signal to the reproducing of a picture signal shown by FIG. 5.

Since the phase-matching step is over, a first-appearing 32 bits are then taken in as shown by block 121.

Figure 8:
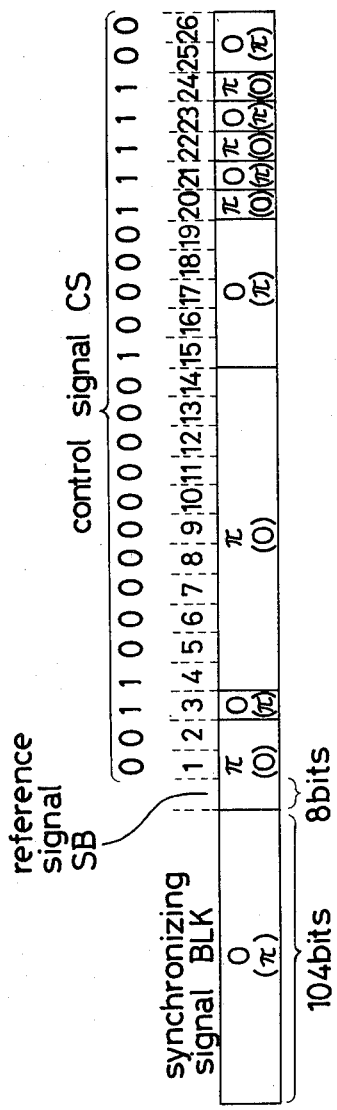
FIG. 8 is a diagram showing one example of signal transmission of control signal.

Then, by detecting continuance of the level for the time length of subsequent 96 bits (i.e., 3 blocks×32 bits) or more of the first 3 blocks shown by the block 122, the foregoing 8-bit signal is identified and confirmed as the reference signal SB as shown by the block 123. Then, by taking 6 blocks (i.e., 6 blocks×32 bits=192 bits) of subsequent part of the control signal CS by means of counting by the counter 76, the remainder of the control signal CS is taken in and decoded. The decoded signal indicate existence or non existence of the picture signal in respective 51 blocks. At the same time, number $\alpha$ of the blocks containing the picture information is counted and $32 \times \alpha$ bits are taken in. In the example of FIG. 8, the number $\alpha$ is 8. Thus a taking in of one scanning line is over, and thereafter the abovementioned steps repeat from the block 121 of FIG. 7(b).

As shown by FIG. 5, the total number of bits of the synchronizing signal BLK, the reference signal SB and the control signal CS is selected as an integral multiple of the number of bit (32 bits) of each blocks of the image information (In the case of FIG. 5, BLK+SB+CS=104+8+208=320=10×32.)

By the abovementioned procedure, since the picture information signal consists of integer number of blocks of 32 bit length and the other part, namely the total of the parts BLK, SB and CS consists of integer number of 32 bits, and the decoding system of FIG. 7(a) operates by taking in and counting the number of 32-bit blocks, and synchronization is made for every 32-bit blocks, it is easy to retain or restore the synchronization even when any failure in an synchronization is made. For example, even when a fatal noise causes a scanning line to lose its synchronization, the next line certainly can restore the synchronization. Therefore, by known deletion-and-interpolation method, a clear reproduction of the picture can be made.

Next, the way of transmitting the synchronizing signal BLK, the reference signal SB and the control signal CS is elucidated with reference to FIG. 8. The phase of the carrier of the reference signal SB is inverted from that of the synchronizing signal BLK. Namely, when the latter is O-phase, or $\pi$-phase, then the former is made $\pi$-phase or O-phase, respectively. Then, the control signals CS for respective subsequent blocks to indicate existence or non existence of the picture information in the blocks are encoded in such a way that "1" (which indicates existence of picture information) is coded by inverting the carrier phase of the block from that of the immediately foregoing signal block (i.e., SB for the block No. 1) and "0" (which indicates non existence of picture information) is coded by non-inversion (i.e., the same phase) of the carrier phase of the block from that of the immediately foregoing signal block. Generally speaking, for the indication of "1" in the k-th block, the phase of the carrier of the k-th block is inverted from that of the immediately foregoing k-1th block, and for the indication of "0" in the k-th block, the phase of the carrier of the k-th block is retained same with that of the immediately foregoing k-1th block.

Figure 9:
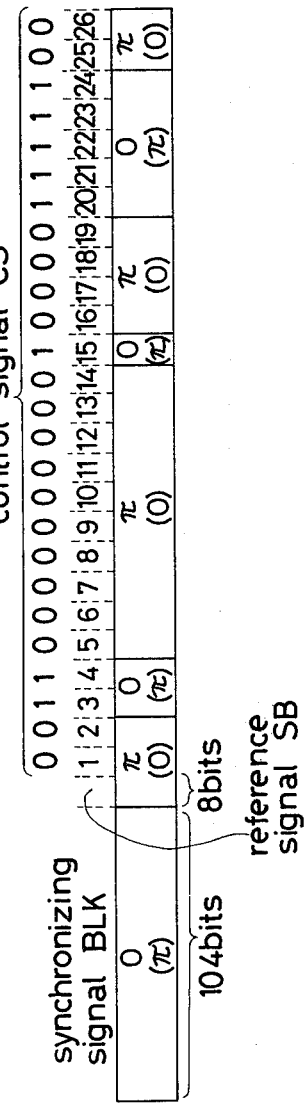
FIG. 9 is a diagram showing another example of signal transmission of control signal.

Next, another method of transmitting the control signal CS is elucidated with reference to FIG. 9. The phase of the carrier of the reference signal SB is inverted from that of the synchronizing signal BLK. Namely, when the latter is O-phase or $\pi$-phase, then the former is made $\pi$-phase or O-phase, respectively. Then, the control signals CS for respective subsequent blocks to indicate existence or nonexistence of the picture signal in the blocks are encoded in such a way that "1" is coded by inverting the carrier phase of the block from that of the reference signal parts SB and "0" is coded by non-inversion (i.e., the same phase) of the carrier phase of the block from that of the reference signal part SB.

Figure 10:
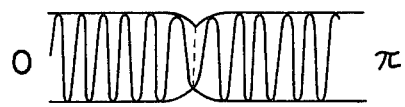
FIG. 10 is a waveform diagram showing modulation of the carrier.
Figure 11:
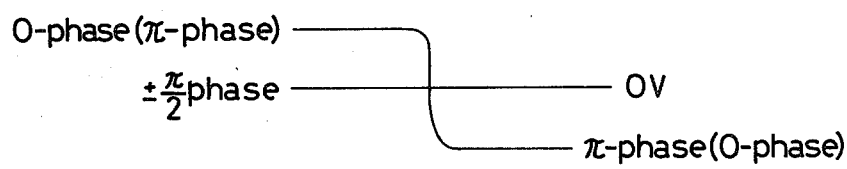
FIG. 11 is a wave form diagram of decoded signal.

Since the encoding of the present invention is made by inversion of the carrier phase of respective blocks of the control signal part in a preset manner, there is substantially no problem of adverse influence by noise and level drift of the signal which are hitherto experienced in the AM encoding. In case that the picture information is transmitted by means of AM-PM-VSB modulation method, the method utilizes inversion of O-phase and $\pi$-phase in its control signal part, and accordingly there is no substantial increase of hardware and expense in the transmitter. In the system of the present invention, the phase-modulation wave, in which the carrier-phase is switched between O-phase and $\pi$-phase as shown by FIG. 10, is synchronize-demodulated in the receiver side. And by passing the demodulated wave through a low pass filter, an output signal shown by FIG. 11 is produced. Since the carrier phases of blocks of the control signal CS are switched with reference to the carrier phase of the reference signal SB, the decoding of the control signal can be made simply by detecting the carrier phases of the control signal part by the basis of that of the reference signal SB. Thus, the control signal is reproduced by making zero-cross detection of the signal shown by FIG. 11.

When a facsimile signal is transmitted through a telephone system, the reproduced signal is likely to be affected by jittering of the telephone line. In an ordinary facsimile system without bandwidth suppression measure, such jittering does not gravely harm the image, but white block skipping type transmissions to which the present invention belongs is susceptible to a grave deterioration of reproduced image by the jittering. Against such possible deterioration, it is useful to provide the picture information signal with guard bands GB shown by FIG. 12(b). The principle and function of the guard bands GB are elucidated with reference to FIG. 12(a) and FIG. 12(b).

Figure 12:
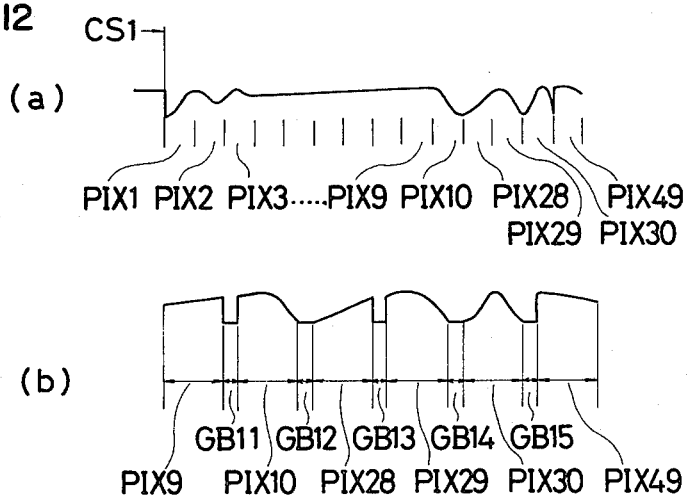
FIG. 12(a) and FIG. 12(b) are diagrams illustrating arranging of guard bands.

FIG. 12(a) shows an enlarged waveform diagram of a picture information part of a facsimile signal, wherein the blocks of image information signal PIX1 to PIX10, PIX28 to PIX30 and PIX49 are shown. When the picture information signal is transmitted through a telephone line system, due to jittering of the telephone line system the information in respective blocks drifts or spread into neighboring blocks thereby interfering neighboring information with each other and gravely distort the picture quality. In order to avoid such interference, it is recommended to put guard bands GB11, GB12, GB13, GB14, GB15 . . . between neighboring blocks of the picture information signal as shown by FIG. 12(b). By means of such guard band, the interference is effectively prevented thereby preventing deterioration of the picture quality. In FIG. 12(b), the level of the guard band is selected to be uniform irrespective of various levels of the front end bits and tail end bits of the picture information signal. However, large level differences between a guard band and adjoining end bit parts of the picture information are liable to be the causes of nick of the end bit parts or of adverse noise in the image due to the guard bands. In order to avoid such problems, it is recommendable to vary the levels of the guard bands GB between "1" and "0".

Figure 13:
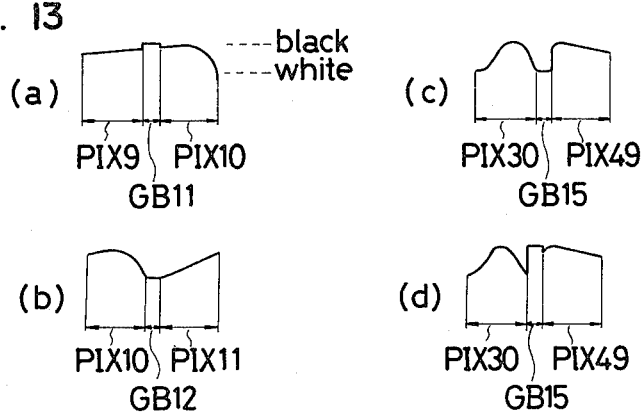
In FIG. 13, (a), (b), (c) and (d), are enlarged diagrams illustrating various examples of arranging of the guard bands.

Examples of such different levels of guard bands method are shown in FIG. 13. In FIG. 13(a), the tail end of the block PIX 9 and the front end of the block PIX 10 are both of the black level or "1" level, and accordingly, the guard band GB 11 in between is preferably of a level of black or "1". In FIG. 13(b), the tail end of the block PIX 10 and the front end of the block PIX 11 are both of white level or "0" level, and therefore the guard band CB 12 inbetween is preferably of a level of white or "0". In FIG. 13(c), the tail end of the block PIX 30 is of "0" level and the front end of the block PIX 49 is of "1" level, and in this case, the guard band GB 15 is made to have the "0" level by taking the level of the tail end of the foregoing block PIX 30. However in the case of FIG. 13(d), where the tail end of the block PIX 30 is of "1" in the same manner as the case of FIG. 13(c), the level of the guard band GB 15 is made "1" level. Which way of FIG. 13(c) or FIG. 13(d) should be taken is to be selected considering relations of amounts of phasing between the modulating part or the demodulating part and the telephone line system.

Figure 14:
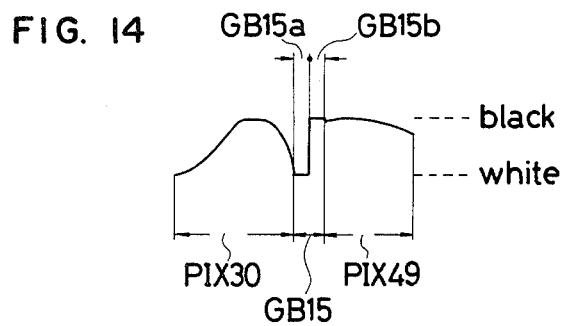
FIG. 14 is an enlarged diagram illustrating another example of arranging of the guard bands.

FIG. 14 shows a further modified embodiment wherein the guard band GB 15 is divided into two parts GB 15a and GB 15b having the "0" level and "1" level, respectively, so as to have respective levels which are near to the adjoining end parts of the blocks of the picture information signal, thereby reducing adverse influence due to level differences between the guard band and the adjoining picture information signal part.

By providing the abovementioned guard band between the blocks of the picture information signal, adverse interference of neighboring blocks of the picture information signal due to jittering of the telephone line system can be avoided.

In case of the abovementioned insertion of the guard band, the overall scanning line length L is integral multiple of the total length of one block of picture information signal and the guard band.

Total bit number of the bit numbers of the synchronizing signal BLK, the reference-signal SB and the control signal CS is made an integral multiple of the total bit number of bit number "m" of one block of the picture information and bit number "p" of the guard bands. By so selecting, when the synchronization is lost in the receiver side, the synchronization can be easily restored by seeking the synchronization signal on the basis of the (p+m) bit period.

The abovementioned descriptions are based on examples wherein
the picture information signal PIX is divided into ... 51 blocks of m=32 bits,
the control signal CS comprises ... 52 blocks of 4 bits, and the highest frequency of the control signal CS is limited under ... 1.3 KHz.

However, when the telephone line system is in poorer condition, it would be necessary to limit the highest frequency of the control signal CS in a lower frequency range. Such modified example is elucidated hereinafter:

If the control signal could be made to contain 8 bits in each block (namely twice to that of the foregoing examples, then the highest frequency of the control signal CS becomes 644 Hz. And if the picture information period would be divided into 51 blocks of 32 bits, then the control signal contains (51 blocks×8 bits=) 408 bits, and this is not advantageous in bandwidth compression.

Accordingly, in the modified example,
the picture information signal PIX is divided into ... 25 blocks of m=64 bits plus last block of 32 bits,
the control signal CS comprises ... 26 blocks of 8 bits, and
the highest frequency of the control signal CS is limited under ... 650 Hz.

Other details of the constitution of the facsimile signal is similar as abovementioned.

Hereupon guard band GB as aforementioned are inserted between the blocks of the picture information part.

For the sake of quick restoring of synchronization, the synchronizing signal BLK should be made to be easily distinguished from the picture information signal. When the synchronizing signal BLK is of the white level and the guard band is not used, a longest white picture signal occurs if both ends of two continuous blocks of the picture information part are black. At that time, the white level of these blocks continues for $(m-1)+(m-1)=2m-2$ bits. Therefore, the synchronizing signal should be selected over the $(2m-2)$ bits in order to restore synchronization quickly because of easy distinction between the synchronization signal and the picture signal.

Figure 15:
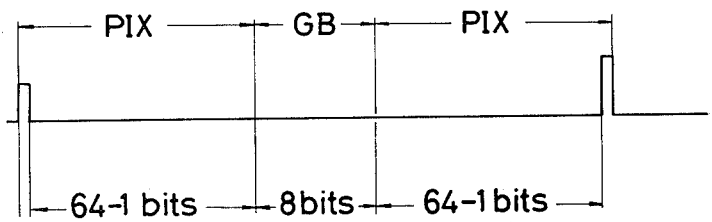
FIG. 15(a) is a diagram showing the case where white signal continues for the maximum time length.
FIG. 15(b) is a diagram showing one example where the white signal is shortened by arranging a guard band by embodying the present invention.
Figure 15:
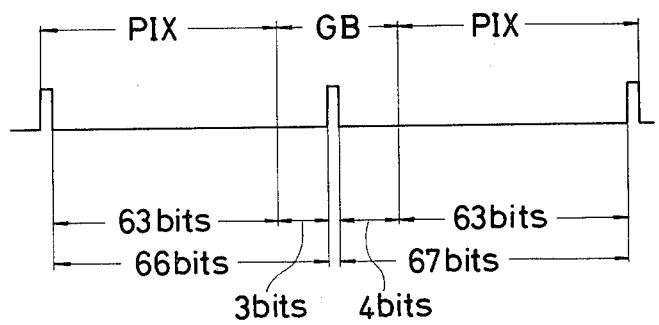

In case the guard band GB is used, the synchronizing signal BLK and neighboring picture information is of the same white level, and provided that blocks adjoining on both sides of the guard band GB have black bit respectively only on their farer end from the guard band GB, then the longest white level period continues for $(m-1)+P+(m-1)=2m-2+P$ bits. Namely as shown in FIG. 15(a), the longest white level is $2m-2+P=134$ bits. Therefore, if the synchronizing signal is the number of bits of $2m-2+P$ or more, it is easily distinguished from the picture information signal, thereby enabling the easy restoration of synchronization. If the synchronizing signal is shorter than the 134 bits, then such white picture signal will be erroneously detected as the synchronizing signal BLK and causes a difficulty of the restoring of synchronization. Such long synchronizing signal causes waste of bandwidth.

However, by using such improved guard band as shown by FIG. 15(b), use of shorter synchronizing signal is possible. FIG. 15(b) shows a guard band GB has a 1-bit black level signal in midway thereof. This black level signal functions to divide the 134-bits long white level signal into two parts, and thereby enable a use of shorter synchronizing signal exceeding only 67-bit length. It was confirmed that insertion of such short black signal as 1 bit does not substantially affect the reproduced picture even when the picture signal is affected by jittering of the transmission line system.

Figure 16:
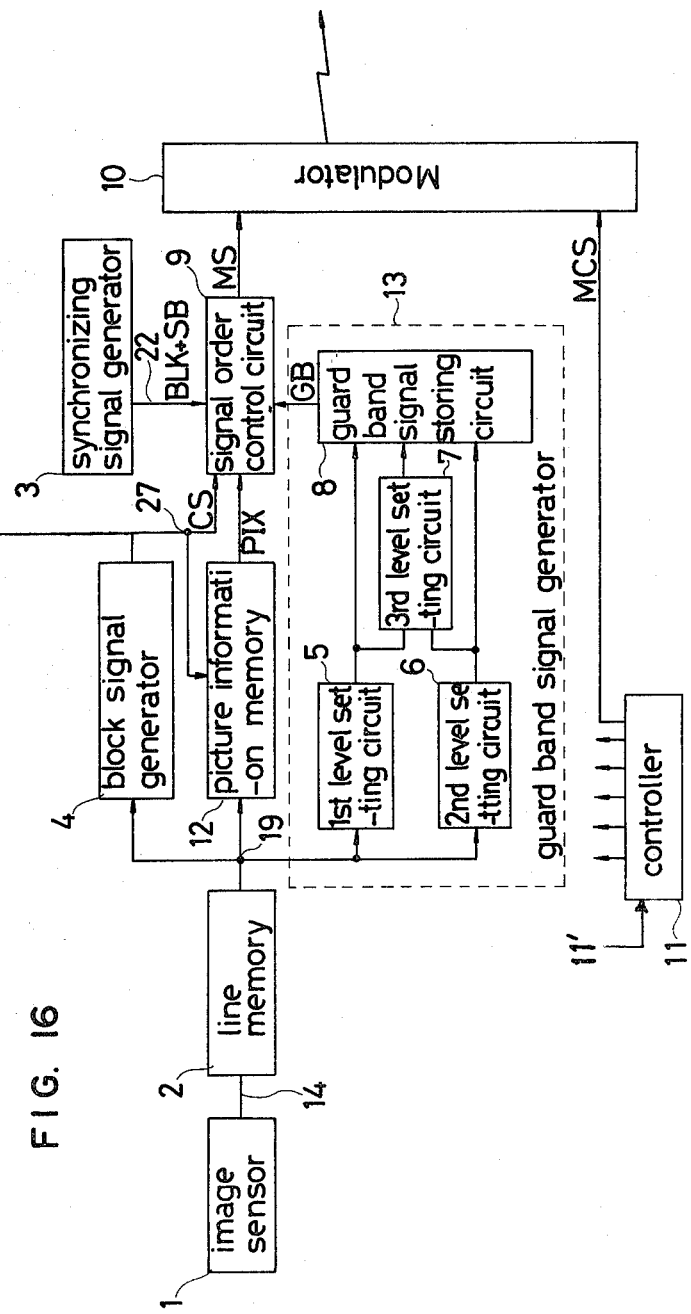
FIG. 16 is a block diagram of a signal transmitter for embodying the bandwidth compression in accordance with the present invention.

An embodiment of transmitter for use in the bandwidth compression system of the present invention is elucidated with reference to FIG. 16.

Output line 14 of an image sensor 1 to read the picture information of a document is connected to the input terminal of a line memory 2 which stores the output of the image sensor 1. A synchronizing signal generator 3 send the synchronizing signal BLK and the reference signal SB through an output line 22 to a signal order control circuit 9. A block signal generator 4 divides the picture signal taken out from the line memory circuit 2 into specific number of blocks PIX 1, PIX 2 ... and give the block signal to the signal order control circuit 9.

Guard band signal generator 13 comprises a first level setting circuit 5 which sets a level of the first half part of the guard band $GB_f$ to either of "1" or "0" which is nearer to that of the tail end part of the immediately foregoing picture signal block, a second level setting circuit 6 which sets a level of the latter half part of the guard band $GB_s$ to either of "1" or "0" which is nearer to that of the front end part of the immediately subsequent picture signal block and a third level setting circuit 7 which sets a level of the narrow pulse (1-bit pulse of FIG. 15(b)) at the central part of the guard band $GB_c$ in a manner that when the first half part and the latter half part of the guard band GB are of both "0" level then the circuit 7 sets the level of the narrow pulse to the black level. The outputs of the circuits 5, 6 and 7 are put in the guard band signal storing circuit 8 which once stores the outputs of the circuits 5, 6 and 7 and outputs a resultant signal to the signal order control circuit 9, which issues output signal to the modulator 10 in the sequential order of the synchronizing signal BLK, the reference signal SB, the control signal CS and the picture information signal PIX which includes between its blocks the guard band signal GB. Every circuit of the transmitter is controlled by the output signal of the controller 11 so as to rightly operate with appropriate timing relations inbetween. The output signal of the modulator is put in the telephone lines.

Figure 17:
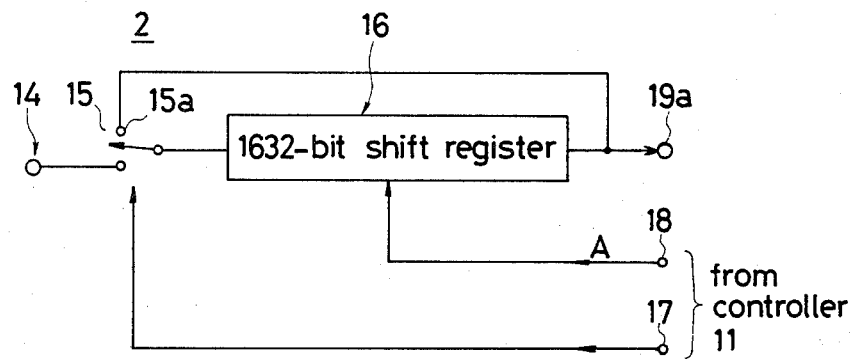

FIG. 17 shows detailed construction of the line memory 2 of FIG. 16. The line memory 2 comprises a 1632-bit shift register 16 having a change over switch 15 at its input terminal 14. Signal from the image sensor 1 is put in through the input terminal 14. The change over switch 15 is thrown to the upper contact 15a for memorization of read-out contents when output of the shift register 16 is read and sent to the block signal generator 4 for producing control signal CS. The control signals CS and shift clock signal A from the controller 11 are given to the input terminals 17 and 18, respectively.

Figure 18:
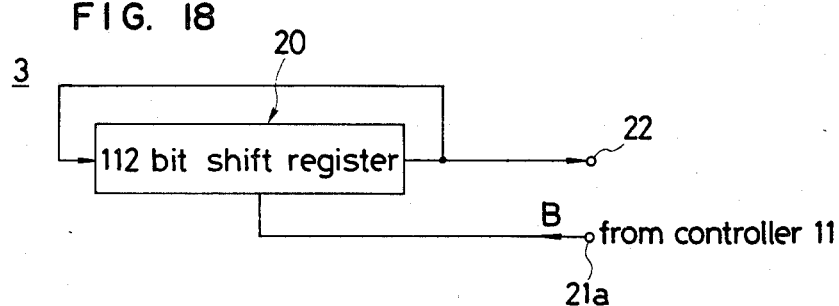

FIG. 18 shows detailed construction of the synchronizing signal generator 3 of FIG. 16, the synchronizing signal generator 3 comprises a 112-bit shift register 20, in which 104 bits of synchronizing signal BLK and 8 bits of reference signal SB are preset and issues at the output terminal 22 and to the signal order control circuit 9 by receiving shift clock signal B from the controller 11 at the terminal 21a. The output terminal of the shift register 20 is connected to the input terminal thereof so as to retain the contents thereof.

Figure 19:
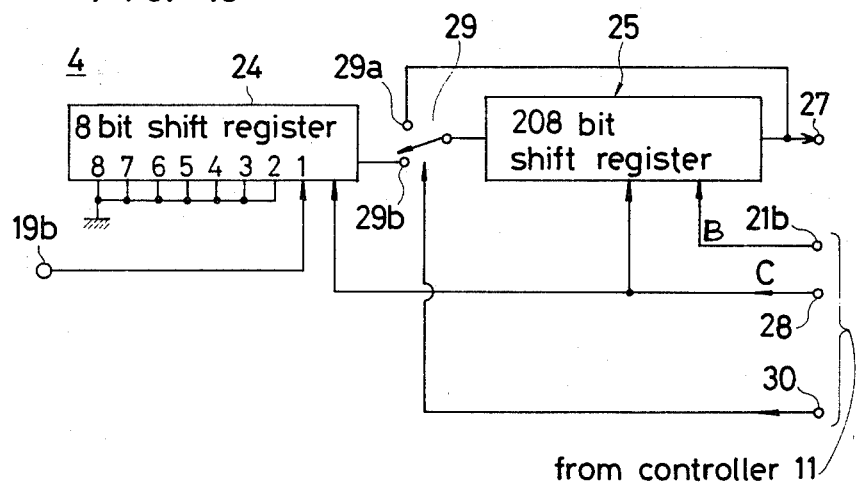

FIG. 19 shows detailed construction of the block signal generator 4 of FIG. 16. The block signal generator 4 comprises an 8-bit pre-settable shift register 24 and a 208-bit shift register memory 25. The input line 19b is connected to the output terminal 19a of the said line memory 2 so as to receive the picture information signal. And the shift register 24 is set by black signal of the picture information. Namely, the shift register can check if the information signal in one block of m=64 is all white or not (any black bit(s) exist). Since the control signal is sent out with blocks each consisting of 8 bits, the shift register 24 for producing the control signal CS is an 8-bit shift register, in which 7 bits are fixedly set to "0" and to the remainder 1 bit is given the picture information from the input terminal 19b. Accordingly, the code of the control signal to represent a block including at least one black picture element is 10000000, and the code to represent a block which does not include black picture element at all is 00000000. These coding is suitable for transmitting the control signal CS by means of phase inverting method. The control signal made by the shift register 24 is transferred to the 208-bit shift register memory 25 by control signal transferring clock signal C given at the terminal 28. The shift register memory 25 memorizes information for one scanning line and outputs at the terminal 27. The stored control signal CS is also used later when the picture signal is sent out, and therefore, the output of the shift register 25 is fed back to its input terminal by throwing the change-over switch 29 to the upper contact 29a for rememorization. The output terminal 27 is connected to the signal order control circuit 9 and also to the input terminal 11' of the controller 11. Change-over signal for driving the switch 29 and clock signal C are given from the controller 11.

Figure 20:
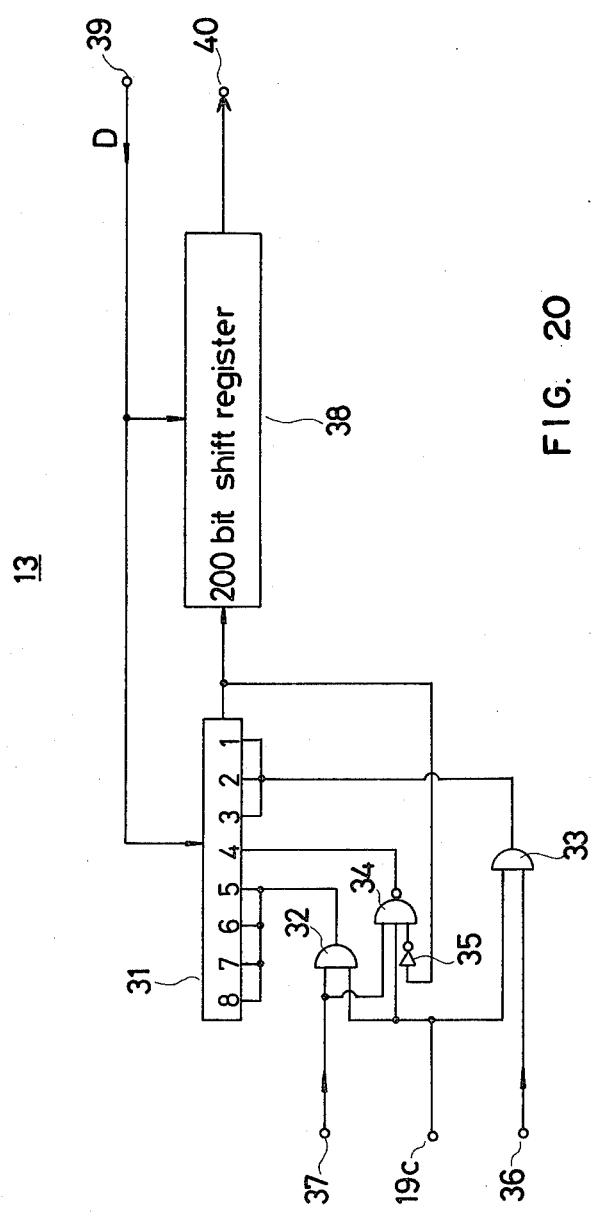

Guard band signal generator 13 of FIG. 16 is shown in FIG. 20, which shows an example for producing the guard bands of p=8 bits. An 8-bit presettable shift register 31 for producing the guard band is connected to give its output to a 200-bit shift register 38. And gates 33 and 32 are connected so as to give their outputs for presetting to the input terminals of a first group No. 1–No. 3 and a second group No. 5–No. 8 of the shift register 31, respectively. Network of an inverter 35 and a NOR gate 34 is connected to the input terminal No. 4 of the shift register 31 to preset to "1" when other input terminals i.e., of the first and the second groups are all "0". The truth table for the guard band $GB_f$ of the first group, the guard band GBs of the second group, and the guard band $GB_c$ of input terminal No. 4 are shown in FIG. 23. A picture signal input terminal 19c is connected to the output terminal 19a of the shift register 16. Terminal 36 receives set signal A for setting the first group bits part of the shift register 31. The set signal A is issued from the controller 11 upon impression of the last bit (64th bit) of the picture information block on the input terminal 19c. The input terminal 37 receives set signal B for setting the second group bits part of the shift register 31. The set signal B also sets the central bit part No. 4 of the shift register 31. The set signal B is issued from the controller 11 upon impression of the first bit of the next picture information block on the input terminal 19c. After impression of the set signal B, by receiving guard band transferring clock signal D the shift register 31 transfers a guard band produced therein to the 200-bit shift register 38 to store it therein.

In the present example, the picture information is divided into 26 blocks, and the guard band has 8 bits, and therefore, the maximum of the total number of the guard band is (26-1)×8=200 bits. However, the number of the guard band depends on number of the picture information block having black picture element, and hence, the number is sometimes smaller than 200 bits. Accordingly, after producing all the guard bands for one scanning line, the first bit of the guard band is preliminarily shifted upto the output terminal 40 of the shift register 38. However, if a first-in-first-out type shift register is used for the shift register 38, there is no need of such preliminary shifting.

FIG. 21 shows the picture information memory 12 of FIG. 16. The picture information memory 12 comprises a 1632-bit shift register 41, whose input terminal 19 is connected to the output terminal 19a of the 1632-bit shift register 16 of the line memory 2 so as to store the picture information of blocks including black picture element(s). An output terminal of a monomultivibrator 23 is connected to an input terminal of an AND gate 26 which gates signals to the 1632-bit shift register 41 so as to open the gate when output from the monomultivibrator 23 is "1". The monomultivibrator 23 issues "1" level output for the period of one block of the picture information signal when the code of the output signal of the shift register 25, i.e., the control signal CS is 10000000. Thus, only the block(s) including black picture element(s) is (are) input to the shift register 41. Picture information contained in the picture information part of one scanning line is 1632-bit or less. Accordingly, in order that a front part of the picture element can be taken out from the output terminal 43 upon completion of processing of on scanning line, the signals are preliminarily shifted up to the output terminal 43. However, if a first-in-first-out shift register is used for the shift register 41, there is no need of such preliminary shifting.

FIG. 22 shows the signal order control circuit 9 which comprises a change over switch 45, whose input terminals are connected to receive synchronizing signal BLK and reference signal SB both from the shift register 20, control signal CS from the shift register 25, picture information signal PIX from the shift register 41 and guard band signal GB from the shift register 38. The signal order control circuit 9 is driven by the selection signals S1 and S2 and issues composed signal MS to a modulator part 10.

Figure 24:
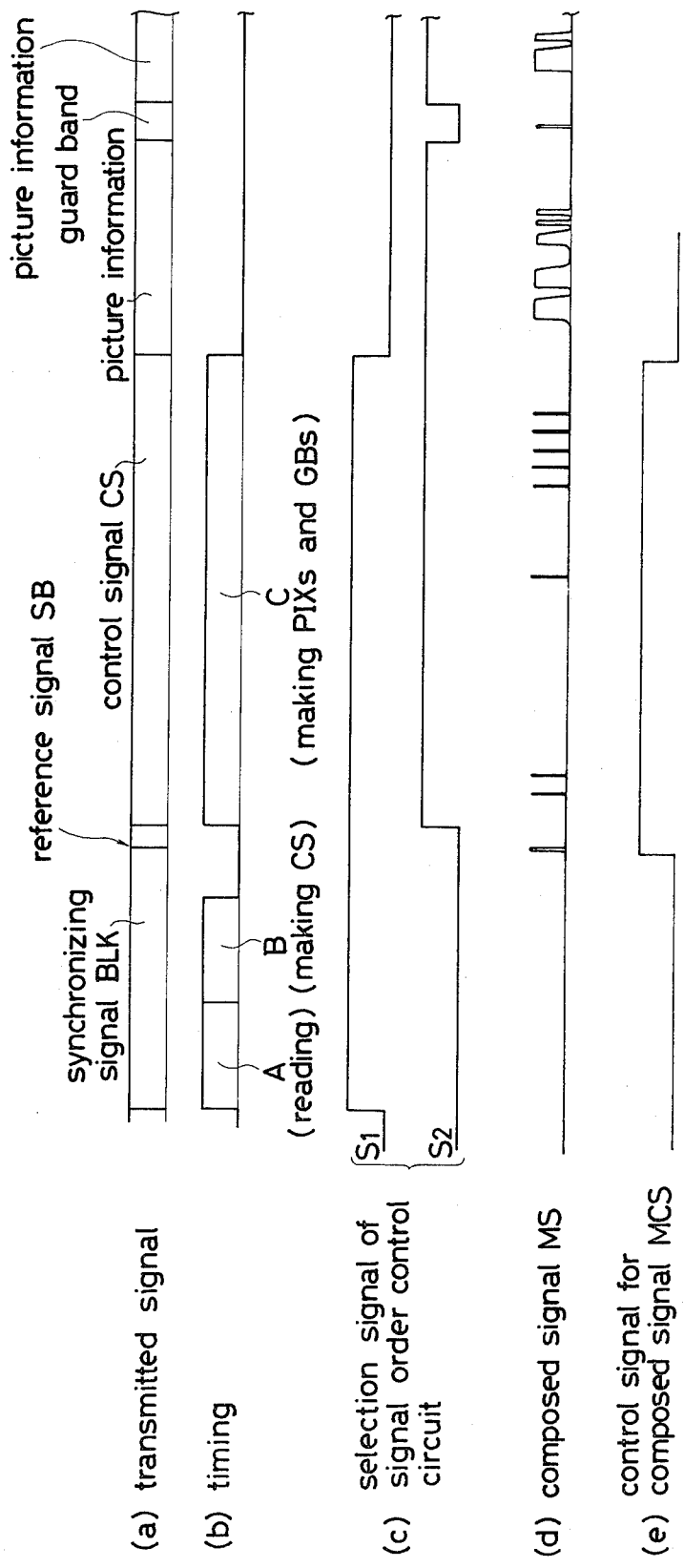
FIG. 24 is an operation time chart showing of an embodiment of the present invention.
Figure 25:
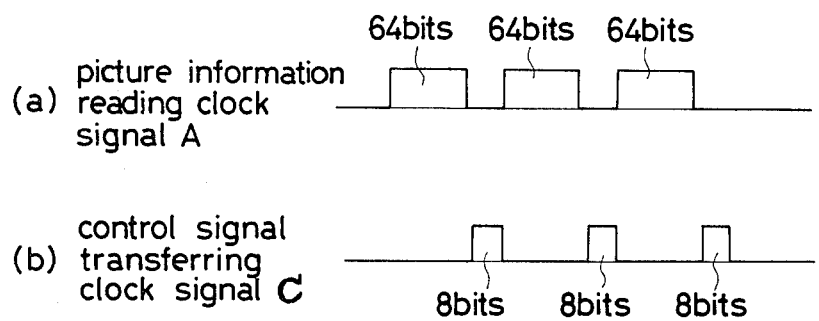
FIG. 25 is an operation time chart showing production of a control signal.
Figure 26:
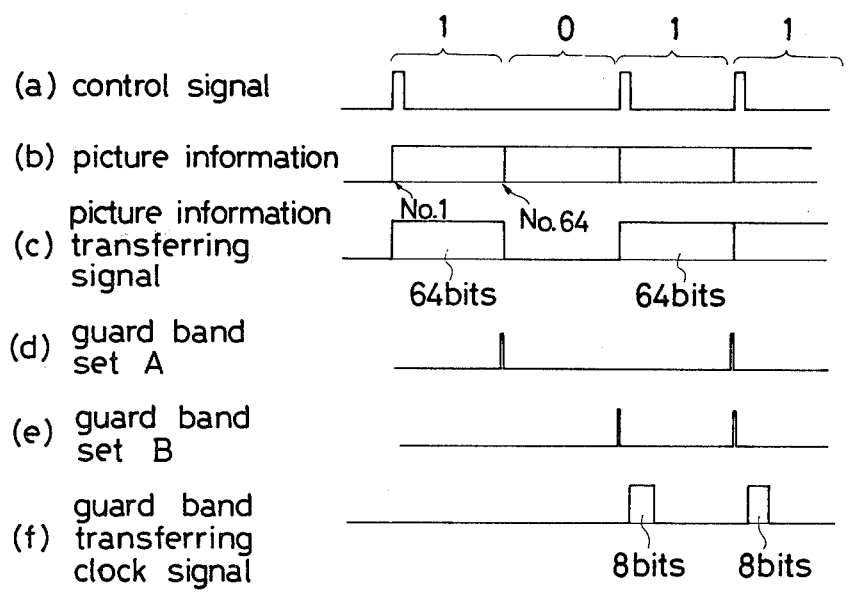
FIG. 26 is an operation time chart showing production of guard bands.

The operation of the transmitter shown by FIGS. 16–22 is elucidated hereafter with reference to wave form charts of FIGS. 24 to 26.

First, in order to select the synchronizing signal BLK and subsequently the reference signal SB, the selection signal S1 and S2 are given to the switch circuit 45, and at the same time, the picture information from the image sensor 1 is read in the shift register 16 during the period A shown by FIG. 24(b).

Upon completion of the read in of one scanning line, the control signals CS is made of the picture information during the period B of FIG. 24(b). The total time length of the one line reading and subsequent forming of the control signal is set to be shorter than the time length of the synchronizing signal BLK.

After completion of sending out of the synchronizing signal BLK and the reference signal SB, the selection signals S1 and S2 are given to the switching circuit 45, thereby to send out the control signal CS, and the guard band signal generator 13 and the picture information memory 12 produces the guard band GB and picture information PIX during the period C of FIG. 24(b).

After completion of the control signal CS, selection signal S1 and S2 for alternately select the picture information signal PIX and the guard band GB to the switching circuit 45. When there is no block picture element in one black at all, then neither picture information nor guard band is sent out, but start the reading in of the next scanning line and simultaneously issues synchronizing signal BLK. Instead, when the picture information memory 12 has at least one black picture information signal, by giving the selection signal S1 and S2 for alternately selecting the picture information signal PIX and the guard band signal GB to the switch circuit 45, a picture information block PIX of 64 bits and guard band GB of 8 bits are alternately sent out. By sending out all the blocks of the picture information PIX and the guard bands, operation of one scanning line is completed.

To the modulator part 10 are given a composed signal MS consisting of the synchronizing signal BLK, the reference signal SB, the control signal CS, the picture information signals PIX and the guard band signals GB shown by FIG. 24(d), as well as a control signal for composed signal MCS for indicating the period of the control signal CS shown by FIG. 24(e).

Next, timing relation forming of the abovementioned control signal is elucidated referring to FIG. 25.

First, the switch 15 of FIG. 17 is turned to the position of 15a so as not to lose the contents of the shift register 16 at reading. And then, picture information for 1 block (of 64 bits) are read out by impressing picture information reading clock signal A (of FIG. 25a) from the controller 11 to the shift clock terminal 18. When a black picture information exist in the 64 bits picture information, then a first bit of the control signal generating shift register 24 is set. And after reading out of picture information for one block from the shift register 16 by the clock signal A, transferring clock signal C (of FIG. 25(b)) for 8 bit control signal is given to the clock signal terminal 28, and the abovementioned 8 bit control signal is stored to the shift register 25. At this time the switch 29 is put on the 29b position. Thus, the control signal CS for one scanning line is made of the picture information for the one scanning line.

Then, timing relation between the picture information without all white block and the guard band is elucidated with reference to FIG. 26. During the period C of FIG. 24(b) in which the picture information signals PIX and the guard bands GB are produced, the control signal CS is issued as shown by FIG. 26(a) from the shift register 25 and is read out by the clock signal B of FIG. 19. Responding to the control signal CS, the picture information signal is read out from the shift register 16 as shown by FIG. 26(b). When a black signal exists in a block of the picture information, the picture information signal is transferred to the shift register 41 by means of the AND gate 26, and the transferring is not made when the control signal is "0". FIG. 26(c) shows a picture information transferring signal which is given to the AND gate to control it. The guard band GB is produced by giving the guard band set pulse A shown by FIG. 26(a) to the terminal 36 at the time of the last bit (64th bit) of a block of the picture information when the control signal is 1, and giving the guard band set pulse B shown by FIG. 26(e) to the terminal 37 at the time of the first bit of the next block of the picture information when the control signal is 1. Then, by impressing the guard band transferring block D shown by FIG. 26(f) to the terminal 39, the 8-bit guard band, which has been produced by the foregoing steps, is read out of the shift register 31 and stored into the shift register 38. Thus, by issuing the control signals, the picture information signal except for all white blocks and the guard band signal are produced.

Figure 27:
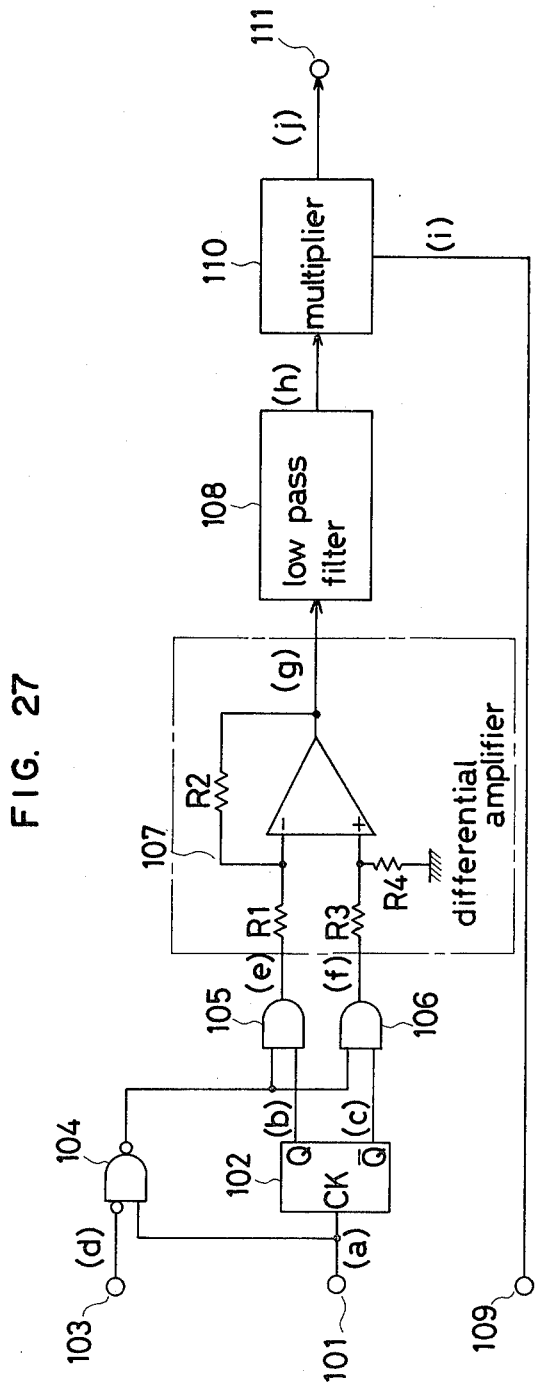
FIG. 27 is a circuit diagram of a modulator 10 of an embodiment of the present invention.
Figure 28:
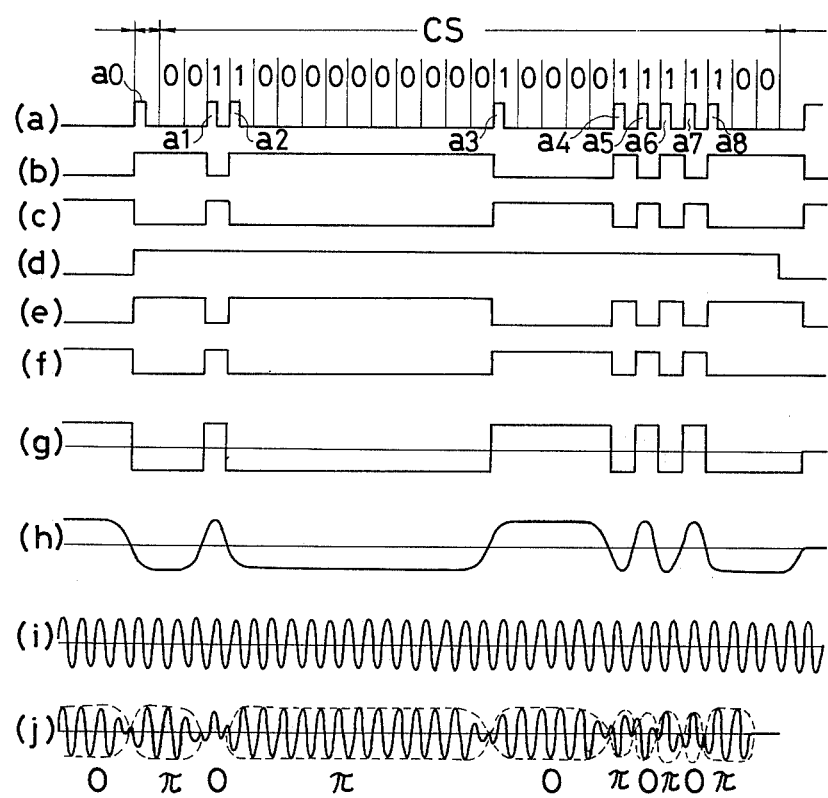
FIG. 28 is a time chart of waveforms of various parts of the modulator 10.

Next, explanation is made on the modulator 10 referring to FIG. 27 and FIG. 28 which are circuit block diagram and waveforms of various parts thereof, respectively.

Composed signal MS of the waveform shown by FIG. 28(a) is impressed on the input terminal 101. The first pulse $a_0$ of the waveform of FIG. 28(a) is for inverting carrier phase between the synchronizing signal part and the reference signal as coding, and the second to ninth pulses of the waveform of FIG. 28(a)) is for inverting carrier phase as codings of the control signal. A flipflop circuit 102 is inverted at detection of a rise-up of the composed signal MS and issues output signals (b) and (c) of FIG. 28 from the output terminal Q, Q. Input terminal 103 receives control signal MCS of FIG. 28(d) for composed signal. The "H" level of this signal MCS indicates that reference signal or control signal is input now. The logic gates 104, 105 and 106 gates to issue signals of (e) and (f) of FIG. 28. A differential amplifier 107 makes a difference between the output of the gates 105 and 106 and issues output having both positive and negative parts as shown by FIG. 28(g). In the circuit of FIG. 27, the resistances R1,R2,R3 and R4 of the resistors have the relation R1/R2=R3/R4.

The output signal of the differential amplifier 107 is taken out through a low-pass filter 108 to the multiplier 110. Thus, the output signal of the low-pass filter 108 becomes as shown by FIG. 28(h) and this output (h) modulates a carrier signal (i) of FIG. 28 in the multiplier 110 and produces modulated signal (j) of FIG. 28 at the output terminal 111. In the output signal (j), carrier phase is inverted at each rise up time of the pulses $a_0$ to $a_8$. The output (j) is transmitted through a telephone line.

What we claim is:

1. A facsimile system, having at least one transmitting end and at least one receiving end; in which a control signal part and a picture information part of a scanning line signal are respectively encoded and decoded in accordance with a white block skipping method; and in which a facsimile signal comprising a carrier modulated by respective scanning line signals is transmitted, a scanning line signal being distinguished from a neighboring scanning line signal by a synchronizing signal part, comprising:

means for generating a reference signal part having a first binary signal level; and means for composing a scanning line signal; said reference signal part being inserted after said synchronizing signal part having a second binary signal level and being before said control signal part to distinguish therebetween; and said picture information part following said control signal part, wherein said synchronizing signal part, said reference signal part, said control signal part, and said picture information part are represented by bits, and the bits of said picture information part are grouped into a plurality of first blocks of uniform length each block including a guard band of a specified number of bits; the total of the number of bits of said synchronizing signal part, said reference signal part, and said control signal part being an integral multiple of a number determined in accordance with the number of bits in a first block.

2. A system as in claim 1, wherein the bits of said control signal part are grouped into a plurality of second blocks of uniform length, each second block having at least two bits for suitably reducing a bandwidth of said facsimile signal.

3. A system as in claim 1, wherein said number determined in accordance with the number of bits in a first block is equal to the number of bits in a first block.

4. A system as in claim 1 wherein a first block contains "m" bits and said synchronizing signal part contains at least 2m−2 bits.

5. A system as in claim 1 further comprising means for generating guard band signals, said composing means further being responsive to said guard band signal generating means for inserting a guard band signal between neighboring first blocks to avoid interference between said neighboring first blocks.

6. A system as in claim 5, wherein a guard band signal is represented by bits, said number determined in accordance with the number of bits in a first block being equal to the number of bits in a first block plus the number of bits in a guard band signal.

7. A system as in claim 6, wherein the level of said guard band signal is the binary level to which a leading portion of a following neighboring first block is closest.

8. A system as in claim 6, wherein the level of said guard band signal is the binary level to which a trailing portion of a preceding neighboring first block is closest.

9. A system as in claim 6, wherein said guard band signal comprises a first part associated with a trailing portion of a preceding neighboring first block, and having a level equal to the binary level to which said trailing portion is more nearly equal; and a second part associated with a leading portion of a trailing neighboring first block, and having a level equal to the binary level to which said leading portion is closest equal.

10. A system as in claim 9, wherein said guard band signal further comprises a center part between said first and second parts, said center part having a level equal to said first level when the level of said first and second parts is equal to said second level.

11. A system as in claim 6 wherein a first block contains "m" bits, a guard band signal contains "P" bits, and said synchronizing signal part contains at least 2m−2−P bits.

12. A system as in claim 1, 4, 5 or 11 further comprising:

means for identifying said synchronizing part; and means responsive to said synchronizing part identifying means to identify said reference signal part and initiate decoding.

13. A facsimile bandwidth compression method comprising the steps of:

dividing a picture information signal comprising a specified number of bits into a specified number of blocks of a uniform length, each block including a guard band of a specified number of bits;

generating a control signal part comprising digital signals indicating the existence or non-existence of substantial picture information in respective blocks;

composing a facsimile signal including a synchronizing signal part, a reference signal part, said control signal part, and a picture information part in the above-mentioned order; said synchronizing signal part being for distinguishing horizontal scanning lines from each other and being of one signal level, said reference signal part being of a different signal level and clearly distinguishable from said synchronizing signal part and said control signal part for indicating the beginning of said control signal part, and said picture information part comprising blocks of said picture information signal containing substantial picture information; said synchronizing signal part comprising a specified number of bits and said reference signal part comprising a specified number of bits; the numbers of bits of said signal parts being selected so that the total of a number of bits of said synchronizing signal part, said reference signal part and said control signal part are an integral multiple of a number of bits of a block of said picture information part.

14. Facsimile bandwidth compression method of claim 13, wherein each bit of said blocks corresponds to a uniform predetermined time length, and each digital signal comprises at least two bits having said predetermined time length.

15. Facsimile bandwidth compression method of claim 14, wherein the number of bits of a block is an integral multiple of the number of bits of which a digital signal of said control part is comprised.

16. Facsimile bandwidth compression method of claim 13 further comprising the step of phase-modulating a carrier in accordance with said synchronizing signal part, said reference signal part, and said control signal part for transmission of said facsimile signal, wherein a phase of a portion of said carrier corresponding to said reference signal part is inverted relative to a phase of a portion of said carrier corresponding to said synchronizing signal part.

17. Facsimile bandwidth compression method of claim 16, wherein a portion of said carrier corresponding to a digital signal of said control signal part indicative of the existence of substantial picture information is modulated by inverting a phase of said carrier relative to a phase of an immediately preceding portion of said carrier.

18. Facsimile bandwidth compression method of claim 17, wherein a portion of said carrier corresponding to a digital signal of said control signal part indicative of the existence of substantial picture information is modulated by inverting a phase of said carrier relative to a phase of a portion of said carrier corresponding to said reference signal part.

19. A facsimile bandwidth compression method comprising the steps of:
dividing a picture information signal comprising a specified number of bits into specified number of blocks of a uniform length;
generating a control signal part comprising digital signals indicating the existence or non-existence of substantial picture information in respective blocks;
composing a facsimile signal including a synchronizing signal part, a reference signal part, said control signal part, and a picture information part in the above-mentioned order, said synchronizing signal part being for distinguishing horizontal scanning lines from each other and being of a first signal level, said reference signal part being a second level clearly distinguishable from said synchronizing signal part and said control signal part for indicating the beginning of said control signal part, said picture information part comprising blocks of said picture information signal containing substantial picture information, and guard bands between adjacent blocks for preventing interference between said neighboring blocks; the numbers of bits of said signal parts being selected so that the total of a number of bits of said synchronizing signal part, said reference signal part and said control signal part are an integral multiple of a total of a number of bits of a block of said picture information part and said guard band.

20. Facsimile bandwidth compression method of claim 19, wherein said guard band has a black level when a trailing part of an immediately preceding neighboring block of said picture information part is substantially black, and a white level when said trailing part is substantially white.

21. Facsimile bandwidth compression method of claim 19, wherein said guard band has a black level when a leading part of an immediately following neighboring block of said picture information part is substantially black, and a white level when said leading part is substantially white.

22. Facsimile bandwidth compression method of claim 19 wherein each block of said picture information part contains a number "m" of bits and said synchronizing signal part contains no less than $2m-2$ bits.

23. Facsimile bandwidth compression method of claim 19, wherein each block of said picture information part contains a number "m" of bits, said guard band signal contains a number "P" of bits, and said synchronzing signal part contains no less than $2m-2+P$ bits.

24. Facsimile bandwidth compression method of claim 19, wherein said guard band includes a first part and a second part, said first part being associated with a trailing part of an immediately preceding neighboring block of said picture information part and said second part being associated with a leading part of an immediately following neighboring block of said picture information part, said first part having a black level when said trailing part is substantially black and having a white level when said trailing part is substantially white, and said second part having a black level when said leading part is substantially black and having a white level when said leading part is substantially white.

25. Facsimile bandwidth compression method of claim 24, wherein said synchronizing signal part is of a white level and said guard band further includes a center part between said first part and said second part, said center part comprising a black level pulse of at least one bit when said first part and said second part are of a white level substantially the same as the white level of said synchronizing signal part.

26. An apparatus for providing bandwidth compressed facsimile signals from respective picture information signals each picture information signal having a plurality of first blocks of uniform bit lengths, said apparatus comprising:
means for generating a control signal part, said control signal part having a number of second blocks at least equal to the number of said first blocks, said second blocks having uniform bit lengths; wherein a second block obtains a value indicative of the presence of substantial picture information in a corresponding first block if a corresponding first block contains substantial picture information, and a second block obtains a value indicative of the absence of substantial picture information in a corresponding first block if a corresponding first block contains non-substantial picture information;
means for obtaining a picture information part, wherein said picture information part comprises first blocks having substantial picture information selected from said picture information signal, no substantial picture information being omitted therefrom and guard bands being inserted in each and between blocks of information;
means for generating a synchronizing signal part having at least a predetermined first number of bits of a first binary level;
means for generating a reference signal part having at least a predetermined second number of bits of a second binary level, the numbers of bits of said signal parts being selected so that the total of the number of bits of said synchronizing signal part, said reference signal part, and said control part being an integral multiple of the number of bits of a first block, and means for combining said synchronizing signal part, said reference signal part, said control signal part, and said picture information part to form a scanning line signal, whereby said synchronizing signal part distinquishes respective scanning line signals from one another, and said reference signal part follows the synchronizing part and indicates the beginning of said control signal part and distinguishes between the control and synchronizing signal parts.

27. The apparatus of claim 26, wherein a first block of said picture information part contains a number "m" of bits and said predetermined first number is equal to $2m-2$.

28. The apparatus of claim 26, wherein a portion of said carrier corresponding to a second block of said control signal part containing a value indicative of the presence of substantial picture information is modulated by inverting a phase of said carrier relative to a phase of a portion of said carrier corresponding to said reference signal part.

29. The apparatus of claim 26 wherein at least one of said second blocks is a dummy code block.

30. The apparatus of claim 26, wherein the number of bits of a first block is an integral multiple of the number of bits of a second block.

31. The apparatus of claim 30, wherein a second block contains at least two bits.

32. The apparatus of claim 26 further comprising means for phase-modulating a carrier in accordance with said respective scanning line signals, wherein a phase of a portion of said carrier corresponding to said reference signal part is inverted relative to a phase of a portion of said carrier corresponding to said synchronizing signal part.

33. The apparatus of claim 32 wherein a portion of said carrier corresponding to a second block of said control signal part containing a value indicative of the presence of substantial picture information is modulated by inverting a phase of said carrier relative to a phase of an immediately preceding portion of said carrier.

34. An apparatus for providing bandwidth compressed facsimile signals from respective picture information signals, each picture information signal having a plurality of first blocks of uniform bit lengths, said apparatus comprising:
means for generating a control signal part, said control signal part having a number of second blocks at least equal to the number of said first blocks, said second blocks having uniform bit lengths; wherein a second block obtains a value indicative of the presence of substantial picture information in a corresponding first block if a corresponding first block contains substantial picture information, and a second block obtains a value indicative of the absence of substantial picture information in a corresponding first block if a corresponding first block contains non-substantial picture information;
means for obtaining a picture information part, wherein said picture information part comprises first blocks having substantial picture information selected from a picture information signal, no substantial picture information being omitted therefrom;
means for generating a synchronizing signal part having at least a predetermined first number of bits of a first binary level;
means for generating a reference signal part having at least a predetermined second number of bits of a second binary level;
means for generating guard band signals having respective predetermined uniform numbers of bits, said combining means further being responsive to said guard band signal generating means for inserting respective guard band signals between neighboring first blocks of said picture information part, the numbers of bits of said signal parts being selected so that the total of the number of bits of said snychronzing signal part, said reference signal part, and said control signal part being an integral multiple of the number of bits of a first block plus the number of bits of a guard band signal; and
means for combining said synchronizing signal part, said reference signal part, said control signal part, and said picture information part to form a scanning line signal, whereby said synchronizing signal part distinguishes respective scanning line signals from one another, and said reference signal part indicates the beginning of said control signal part.

35. The apparatus of claim 34 wherein the number of bits of a first block is an integral multiple of the number of bits of a second block.

36. The apparatus of claim 35, wherein a second block contains at least two bits.

37. The apparatus of claim 34, 35 or 36, wherein said guard band signal has a black level if a trailing portion of an immediately preceding neighboring first block of said picture information part has a substantially black level, and a white level if said trailing portion has a substantially white level.

38. The apparatus of claim 34, 35, or 36. wherein said guard band has a black level if a leading portion of an immediately following neighboring first block of said picture information part has a substantially black level, and a white level if said leading portion has a substantially white level.

39. The apparatus of claim 34, 35 or 36, wherein said guard band includes a first part and a second part, said first part having a black level when a trailing portion of an immediately preceding neighboring first block of said picture information part has a substantially black level, and a white level if said trailing portion has a substantially white level; and said second part having a black level if a leading portion of an immediately following neighboring first block of said picture information part is substantially black, and having a white level if said leading portion is substantially white.

40. The apparatus of claim 39, wherein said synchronizing signal part is of a white level, and said guard band further includes a center part between said first part and said second part, said center part having a level of black when said first part and said second part are of a white level substantially the same as the white level of said synchronizing signal part.

41. The apparatus of claim 34, wherein a first block of said picture information part contains a number "m" of bits, said guard band signals contains a number "P" of bits, and said predetermined first number is equal to $2m-2+P$.

* * * * *